United States Patent [19]
DiLullo et al.

[11] Patent Number: 4,728,275
[45] Date of Patent: Mar. 1, 1988

[54] MULTI-BLADED DISC CUTTER FOR UNDERWATER PELLETIZERS

[75] Inventors: Robert J. DiLullo, Paoli, Pa.; David E. Ofstein, Williamsburg, Va.

[73] Assignee: ARCO Chemical Company, Newtown Square, Pa.

[21] Appl. No.: 909,048

[22] Filed: Sep. 18, 1986

[51] Int. Cl.⁴ .................................................. B29B 9/06
[52] U.S. Cl. ............................................ 425/67; 83/99; 83/580; 83/906; 264/142; 425/311; 425/313
[58] Field of Search ............... 425/311, 313, 316, 296, 425/289, 67; 264/142; 83/98, 99, 580, 906; D28/45, 50; 241/82.2, 82.7, 86.1, 46 R; 30/347

[56] References Cited

U.S. PATENT DOCUMENTS

| | | | |
|---|---|---|---|
| 3,283,488 | 11/1966 | Franklin | 30/347 |
| 3,973,890 | 8/1976 | Porter et al. | 425/311 |
| 4,251,198 | 2/1981 | Altenburg | 425/313 |

FOREIGN PATENT DOCUMENTS 148511  11/1981  Japan .................... 264/142

Primary Examiner—Jay H. Woo
Assistant Examiner—Karl D. Sturge
Attorney, Agent, or Firm—Lewis J. Young

[57] ABSTRACT

Multi-bladed disc cutter for cutting into pellets thermoplastic material extruded from a die plate of an underwater pelletizer, wherein the blades of the cutter are integrally formed on the periphery of a backplate and radially project therefrom, the sidewalls of the blades being integrally connected by shroud members to provide added strength against bending and twisting of the blades under load. Perforations are provided in the shroud members and backplate to permit passage of water to cool and flush away the cut pellets. Additionally, integrally formed blades may be arranged in concentric circles inwardly of the periphery of the backplate. The integral of the disc cutters avoids weakening and misalignment of the blades, saves space and permits a greater number of cutting edges than is possible in disc cutters wherein the blades are fastened to a hole by bolts. Casting the cutter integrally with its blades permits off-line grinding for final alignment purposes.

10 Claims, 5 Drawing Figures

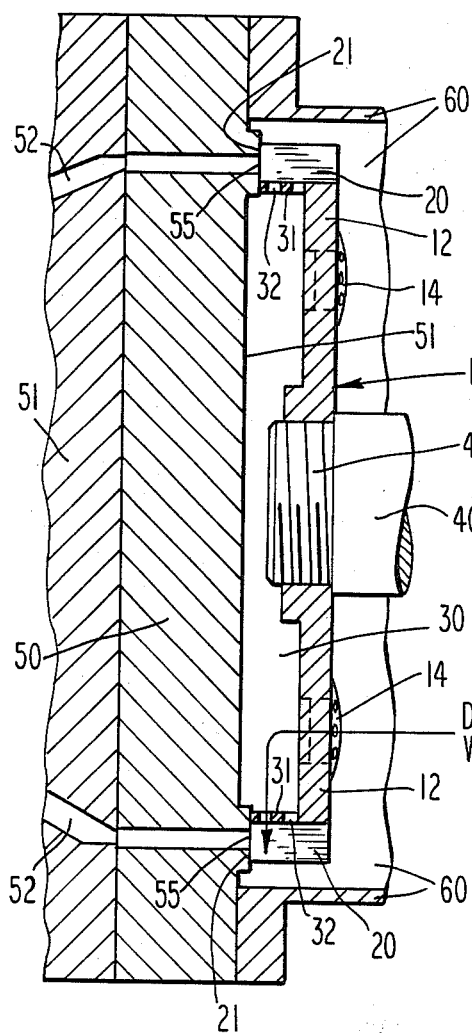
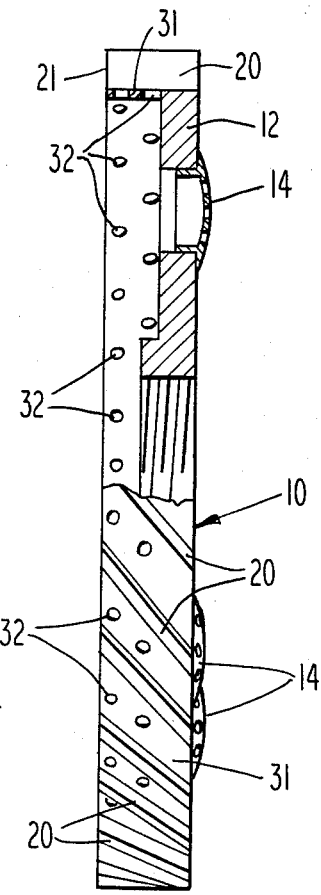
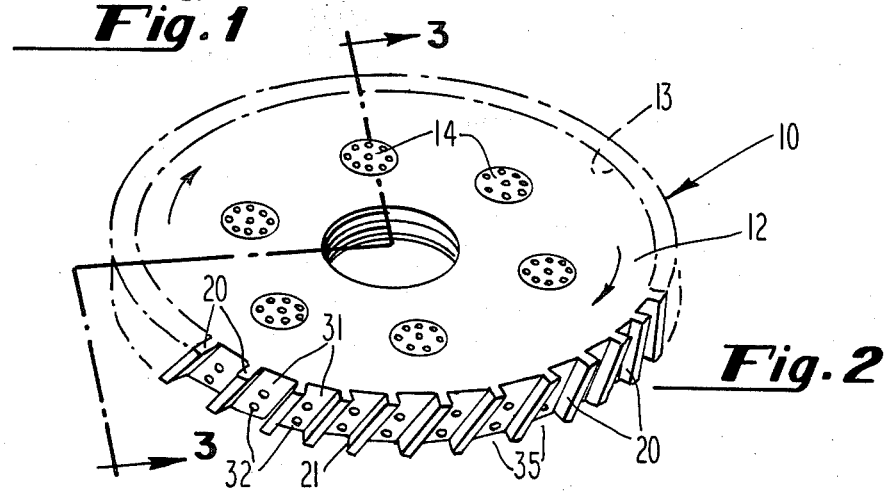
Fig. 1
Fig. 3
Fig. 2

MULTI-BLADED DISC CUTTER FOR UNDERWATER PELLETIZERS

TECHNICAL FIELD

This invention relates to underwater thermoplastic pelletizers and, in particular, to an improved cutter for cutting thermoplastic strand into pellets and for conveying the pellets.

BACKGROUND OF THE INVENTION

Underwater pelletizers are known which employ rotating disc cutters to cut or sever stranded polymer as it exits from the die plate of an extruder. The cutting is accomplished in a chamber full of circulating water which functions to cool the strand and also to carry away the cut pellets. The prior art disc cutters are of two types: (1) knives which extend radially from a central hub or (2) multiple blades which are attached to the ends of a spoked hub. In either case, the knives or blades are fastened to the hub by bolts. This requires access for fastening tools, such as wrenches. It also requires the hub to be relatively thick in cross section to provide adequate strength for supporting the blades. Due to the method of fastening, the space between blades is greater than is required for cutting the strand and discharging the cut pellets. Hence, the number of cutting edges is limited by the hub geometry.

Prior art disc cutters are a very open design. This allows the circulating water to remove heat from the die face quickly and sometimes causes what is known as die "freeze-off", that is, premature or excessive cooling of the extruded thermoplastic which tends to block off the extrusion orifices. To keep the die holes open, more heat is required.

As indicated above, prior art blades or knives have been attached individually to the hub. As a result, alignment with the die face is required, necessitating a run-in period before production can begin.

Moreover, the prior art blade-type cutters and knife-type cutters, because of their manner of attachment to the spoke or to the hub, tend to bend or twist under load, causing the cutting angle to vary. This tendency results in pellets which lack uniformity.

A representative prior art underwater pelletizer of the foregoing type is that described in U.S. Pat. No. 4,251,198 issued Feb. 17, 1981 to H. S. Altenberg and assigned to Gala Industries, Inc.

SUMMARY OF THE INVENTION

An object of the present invention is to provide a multi-bladed disc cutter for an underwater type of pelletizer which is an improvement over the prior art disc cutters described above, including that shown in U.S. Pat. No. 4,251,198.

In accordance with the present invention, the problems and disadvantages of the prior art cutter mechanisms, as described briefly above, are avoided or at least minimized by providing a multi-bladed disc cutter integrally formed by casting the blades as a part of the disc cutter, thereby eliminating the need for separate fasteners such as bolts, and thereby saving the space which would otherwise be wasted if the blades had to be separately fastened to the hub or spoke and providing a greater number of cutting edges than in disc cutters wherein the blades are individually mounted. The foregoing and other aspects, features and advantages of the invention will be apparent from the specification which follows.

BRIEF DESCRIPTION OF THE DRAWINGS

FIG. 1 is a fragmentary, vertical section showing an extruder die plate and one form of a new multi-bladed disc cutter according to the present invention.

FIG. 2 is a partially diagrammatic, perspective view of the form of cutter shown in FIG. 1.

FIG. 3 is a partially fragmentary section on the line 3—3 of FIG. 2.

DESCRIPTION OF THE PREFERRED EMBODIMENTS

Figure 4:
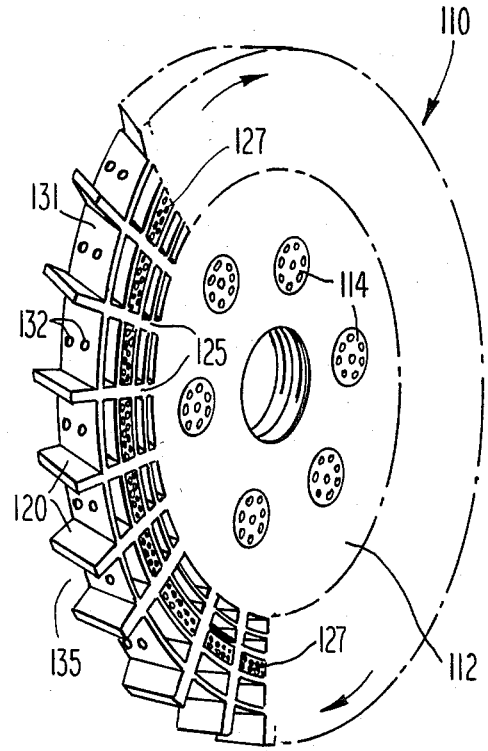
FIG. 4 is a partially diagrammatic, perspective view of a modified form of cutter according to the present invention.

Reference is first made to FIGS. 1-3 which show one form of a new multi-bladed disc cutter according to the present invention.

As there shown, the cutter 10 comprises a cast metal backplate 12 of circular configuration having projecting radially from its periphery 13 a plurality of integral equally-spaced cutter blades 20 forming therebetween radial channels 35. As seen in FIGS. 1 and 3, the thickness of the circular disc or backplate 12 is substantially less than the length of the cutter blades 20 in the axial direction, i.e., in the direction parallel with the center axis of the circular cutter body or backplate 12. As a result of this construction, a cylindrical recess or cavity 30 is formed. In the absence of a shroud, to be described, the cylindrical recess 30 would be open at its periphery in the channels 35. It is not desired that the recess 30 be open to that extent and, accordingly, thin shroud members 31 are integrally formed between the cutter blades 20 during the casting of cutter 10. These shroud members 31 interconnect the sidewalls of cutter blades 20 at their projecting portions, i.e., at the portions of the cutter blades which project axially beyond backplate 12. Thus, shroud members 31 provide the blades 20 with additional strength against bending and twisting under load conditions. As will be discussed more fully below, each of the shroud members 31 is provided with a pair of holes or openings 32 to allow a desired quantity of water from the closed recess 30 to reach, cool, and flush away the cut pellets.

In a preferred form of the new cutter, blades 20 are angularly positioned in helical gear-fashion as is clearly illustrated in FIGS. 2 and 3. This facilitates the cutting of the extruded thermoplastic material and forces the cut pellets through the channels 35 into the water filled hood or chamber 60.

In FIG. 1, the cutter 10 is shown mounted on the threaded end portion 41 of a drive shaft 40 which, powered by means not shown, drives the cutter disc rotationally at the desired speed. Drive shaft 40 is coaxial with the coaxial center of a flat die plate 50 which closes the forward end portion of an extruder 51 having therein a plurality of passageways or channels 52 which terminate in extrusion orifices 55 arranged in at least one circular pattern, usually a series of concentric arrays.

The extrusion orifices 55 are located in the flat face of die plate 50 and, as already indicated, form a circular pattern not illustrated in the drawing but well known.

The diametric distance between the center axes of opposed cutter blades 20 is equal to the distance between centers of diametrically opposed extrusion orifices 55 in the face of die plate 50. The cutting edge 21 of the cutter blade 20 is closely adjacent the extrusion-orifice circle. Thus, as the disc cutter 10 is driven rotationally, the heated thermoplastic material being extruded through the orifice 55 is severed into cut pellets by the blades 20. These pellets form in the channels 35 and are flushed therefrom into the interior of the water-filled chamber 60.

As is well known, the extruded thermoplastic material is heated and is warm. However, as soon as the material is extruded and cut into pellets, the pellets should be cooled so as to effect some hardening thereof. For this purpose, it is known to cut the pellets under cool water. But, if the cooling is excessive, hardening of the thermoplastic material begins too soon and "freeze off" occurs, i.e., the extrusion orifices become blocked with hardened plastic material. This is avoided in the design of the cutter of the present application, as will now be described.

Referring now particularly to FIG. 1, the disc cutter 10, mounted on the threaded portion 41 of drive shaft 40, is driven rotationally in a hooded chamber or housing 60. This chamber is filled with cooling water. Water passes in the direction indicated through screens 14 into the inner recess 30 and is thrown by centrifugal force through the holes 32 in the shroud members 31 into the channels 35 between the cutter blades 20. Here the water engages and cools the cut thermoplastic strand and flushes away the cut pellets as they are discharged from the die plate into the channels 35.

The new cutter and its advantages will now be summarized. The cutter blades 20 are cast as an integral part of the disc cutter thereby eliminating the need for bolts or other separate fasteners and the space required to effect fastening. This cast cutter can be ground to its final alignment condition off the extruder thereby eliminating a run-in period required by prior art individually mounted blades. The new cutter has, for example, 24 blades as against a maximum of 16 blades in prior art cutters. This allows 1½ times the number of cuts per revolution. Therefore the pellets will be ⅔ the size. Smaller pellets are desirable in processing many thermoplastics. However, the cutter design of the invention can be expanded beyond 24 blades if desired. Each blade on the new cutter projects axially beyond the thickness of the backplate 12. It is supported along the entire circumferentially-inward edge of the projecting portion by a thin shroud 31 formed integrally and which extends between and connects adjacent blades. This shroud member 31 adds rigidity and reduces bending and twisting.

The circular backplate 12 is fitted with screened holes at 14 to permit the circulating water to enter recess 30 and flush across and cool the die plate 50. The screens 14 hold back the already-cut pellets which are in the circulating water stream. Centrifugal action pulls water from the inner recess 30 radially outwardly through the smaller holes 32 in the shroud members 31 where the water cools the strand being cut and flushes away the cut pellets. The backplate 12 and shroud members 31 limit the amount of water that comes into contact with the face of the die plate 50. The location and size of the holes in the shroud members 31 control the flow pattern to reduce turbulence at the die face. These features also reduce the rate of heat loss from the die face and from the thermoplastic strand. Moreover, the potential for "freeze off" is thereby reduced and the quantity of heat required for the entire operation is lessened.

Figure 5:
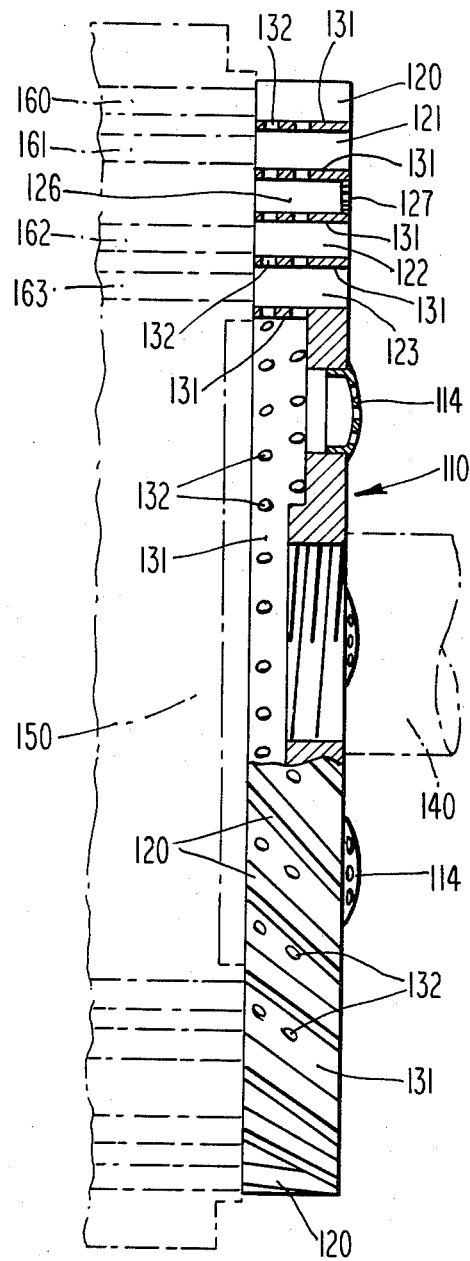
FIG. 5 is a partially perspective, partially sectional view showing a die plate in phantom and showing in section the cutter of FIG. 4.

FIGS. 4 and 5 illustrate a modified form 110 of the new multi-bladed disc cutter. The cutter 110 is designed to simultaneously cut into pellets a thermoplastic strand being extruded from orifices positioned on the face of the die plate in a series of concentric circles. Orifices 160, 161, 162 and 163 of four such concentrically positioned extrusion orifices are illustrated in dot-and-dash line in FIG. 5. To achieve simultaneous cutting of the strands being extruded from the four concentric circles of orifices 160, 161, 162, and 163, four concentric circular sets of cutter blades 120, 121, 122, and 123 are provided.

As seen in FIGS. 4 and 5, the basic design of the cutter 110 is generally similar to that of the cutter 10 of FIGS. 1-3 and it will not be necessary to describe those features which are common to both cutters 10 and 110. As in the case of cutter 10, the entire disc cutter 110 shown in FIG. 4 is a metal casting provided with screens 114. All of the radially-successive cutter blades, of which four (120-123) are illustrated, are integrally formed with the hub 112. The blades 120-123 are connected radially by spokes 125 and circumferentially-adjacent blades are interconnected by four sets of shroud members 131. Each shroud member 131 is provided with a pair of holes or openings 132 through which flushing water is forced by centrifugal action when the cutter is being driven rotationally. Between circumferentially-adjacent cutter blades, the backplate 112 is cut out to provide unobstructed exits for the cut pellets. As shown in FIGS. 4 and 5, a circumferential path for water flow is provided between the outer pair of concentric blades 120 and 121 and the inner pair of concentric blades 122 and 123. This water path is provided by a circumferential series of passageways 126 having no cutter blades and having a perforated wall 127 at the surface of the backplate 112.

It will be understood that while four concentric circular sets of cutter blades have been described in connection with FIGS. 4 and 5, the basic design illustrated therein may be used to construct a cutter having a greater or lesser number of concentric sets of cutter blades. It is preferable that every third circle be devoid of blades, as is illustrated in FIGS. 4 and 5 by the passageways 126.

While the invention has been illustrated and described in what are considered to be the most practical and preferred embodiments, it will be recognized that many variations are possible and come within the scope thereof, the appended claims therefore being entitled to a full range of equivalents.

What is claimed is:

1. A multi-bladed disc cutter for an underwater pelletizer for cutting into pellets thermoplastic material extruded from the face of a die, said cutter comprising:
   a. a rotatable circular disc backplate having a center axis of rotation and having openings through said backplate for passage of water;
   b. a plurality of spaced-apart cutter blades integrally formed with said disc backplate at the periphery thereof and projecting radially outwardly therefrom;
   c. each of said blades having a dimension in the axial direction of said backplate substantially greater than the axial thickness of said backplate forming an axially projecting portion and forming at the axial end thereof a cutting surface for severing thermoplastic strand as it exits from the face of a flat extrusion die plate;
d. shroud members integrally formed with said backplate interconnecting sidewall surfaces of adjacent blades, said shroud members having a width which extends the full axial length of said axially projecting portion of said cutter blade, and
e. at least one radially extending opening in each of said shroud members for allowing passage of water therethrough.

2. A multi-bladed disc cutter according to claim 1 wherein said cutter disc has a plurality of spaced-apart, integrally formed cutter blades arranged in concentric circles.

3. A multi-bladed disc cutter according to claim 2 wherein a circumferentiaal passageway for water is provided between each pair of concentric circles of cutter blades, said passageways being provided with screened access openings in the surface of said backplate.

4. A multi-bladed disc cutter according to claim 2 wherein said radially projecting cutter blades are angularly positioned in helical-gear fashion.

5. A multi-bladed disc cutter according to claim 1 wherein said radially projecting cutter blades are angularly positioned in helical gear-fashion.

6. In an underwater pelletizer, the combination of a die plate and a multi-bladed disc cutter; said die plate having a flat face and passageways therethrough through which thermoplastic pellet-forming material is extrudable, said passageways terminating in at least one circular array of extrusion orifices in the flat face of said die plate; said multi-bladed disc cutter comprising:
a. a rotatable circular disc backplate having a center axis of rotation coaxial with said flat face of said die plate, said axis being parallel with the direction of extrusion through said orifices, said backplate having openings therethrough for passage of water;
b. a plurality of spaced-apart cutter blades integrally formed with said backplate at the periphery thereof, said cutter blades projecting radially outwardly therefrom;
c. said cutter blades having a dimension in the axial direction of said backplate substantially greater than the axial thickness of said backplate forming an axially projecting portion and forming at the end thereof a cutting surface for severing thermoplastic strand as it exits from the extrusion orifices in said die plate;
d. shroud members integrally formed with said backplate having a width extending the full axial length of said axially projecting portion of said cutter blades, said shroud members integrally interconnecting sidewall surfaces of adjacent cutter blades; and
e. at least one radially extending opening in each of said shroud members for allowing passage of water therethrough.

7. The combination according to claim 6 wherein
said die plate has a plurality of extrusion orifices arranged in a plurality of concentric circles, and
said cutter disc has a plurality of spaced-apart, integrally formed cutter blades arranged in a plurality of concentric circles, the adjacent blades of each concentric circle being interconnected by a shroud member having at least one opening therethrough.

8. The combination according to claim 7 wherein a circumferential passageway for water is provided between each pair of concentric circles of cutter blades, said passageway being provided with access openings in the face surface of said backplate.

9. The combination according to cl;aim 7 wherein said radially projecting cutter blades are angularly positioned in helical-gear fashion.

10. The combination according to claim 6 wherein said radially projecting cutter blades are angularly positioned in helical-gear fashion.

* * * * *